United States Patent
Pakkala et al.

(10) Patent No.: US 8,388,313 B2
(45) Date of Patent: Mar. 5, 2013

(54) EXTRACTION CAVITY WING SEAL

(75) Inventors: Srinivas Pakkala, Karnataka (IN); Anil Salunkhe, Greer, SC (US); Hari Meka, Karnataka (IN)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 12/612,697

(22) Filed: Nov. 5, 2009

(65) Prior Publication Data

US 2011/0103949 A1    May 5, 2011

(51) Int. Cl.
*F01D 11/00* (2006.01)

(52) U.S. Cl. ............... 415/214.1; 415/108

(58) Field of Classification Search .......... 415/108, 415/145, 220, 214.1
See application file for complete search history.

(56) References Cited

U.S. PATENT DOCUMENTS

| | | | | |
|---|---|---|---|---|
| 3,628,878 A * | 12/1971 | Trassel et al. | ............... | 415/108 |
| 3,690,785 A * | 9/1972 | Lind | ............... | 415/108 |
| 3,754,833 A * | 8/1973 | Remberg | ............... | 415/108 |
| 3,898,799 A * | 8/1975 | Pollert et al. | ............... | 60/226.1 |
| 3,934,480 A | 1/1976 | Nederlof | | |
| 5,667,224 A * | 9/1997 | Streckert et al. | ............... | 277/634 |
| 5,738,488 A * | 4/1998 | Gazzillo et al. | ............... | 415/112 |
| 6,059,295 A | 5/2000 | Thompson | | |
| 6,164,656 A * | 12/2000 | Frost | ............... | 277/312 |
| 6,199,871 B1 | 3/2001 | Lampes | | |
| 6,406,027 B1 * | 6/2002 | Aksit et al. | ............... | 277/355 |
| 7,094,026 B2 * | 8/2006 | Coign et al. | ............... | 415/189 |
| 7,238,003 B2 * | 7/2007 | Synnott et al. | ............... | 415/139 |
| 7,559,741 B2 * | 7/2009 | Reichert et al. | ............... | 415/173.1 |
| 2004/0062640 A1 | 4/2004 | Darkins, Jr. et al. | | |

FOREIGN PATENT DOCUMENTS

WO   WO 92/11444   * 7/1992

* cited by examiner

*Primary Examiner* — Edward Look
*Assistant Examiner* — Liam McDowell
(74) *Attorney, Agent, or Firm* — Sutherland Asbill & Brennan LLP

(57) ABSTRACT

A pressure containing casing for a turbine engine. The pressure containing casing may include a first extraction cavity, a second extraction cavity, an interface between the first extraction cavity and the second extraction cavity, and a wing seal positioned within the interface.

17 Claims, 4 Drawing Sheets

US 8,388,313 B2

EXTRACTION CAVITY WING SEAL

TECHNICAL FIELD

The present application relates generally to turbine engines and more particularly relates to wing seals for extraction cavities in a double wall compressor configuration.

BACKGROUND OF THE INVENTION

In a gas turbine engine, air is pressurized in a compressor, mixed with fuel in a combustor, and ignited for generating hot combustion gases. The hot combustion gases flow downstream through several turbine stages so as to extract energy therefrom. The pressurized air from the compressor may surround the combustor so as to cool the liners thereof. The pressurized air also may be extracted so as to cool the various turbine stages.

The compressor thus has several pressurized cavities such as extraction cavities in communication with the turbine and otherwise. For example, known double wall casing configurations for a compressor with extraction cavities may have a floating member that may move in radial and axial directions so as to accommodate thermal growth. Such movement, however, may make sealing between the extraction cavities difficult. Moreover, quantifying the leakage through the cavity interfaces also may be difficult to determine.

There is thus a desire for improved seals and sealing methods for the interface between a high pressure extraction cavity and a lower pressure extraction cavity. Such improved seals and methods may increase compressor performance as well as overall system performance and efficiency.

SUMMARY OF THE INVENTION

The present application thus provides a pressure containing casing. The pressure containing casing may include a first extraction cavity, a second extraction cavity, an interface between the first extraction cavity and the second extraction cavity, and a wing seal positioned within the interface.

The present application further provides a gas turbine engine. The gas turbine engine may include a turbine and a compressor in communication with the turbine. The compressor may include a pair of extraction cavities and an interface therebetween. A wing seal may be positioned within the interface.

The present application further provides a steam turbine engine. The gas turbine engine may include a number of pressurized cavities, an interface therebetween, and a wing seal positioned within the interface.

These and other features and improvements of the present application will become apparent to one of ordinary skill in the art upon review of the following detailed description when taken in conjunction with the several drawings and the appended claims.

DETAILED DESCRIPTION

Figure 1:
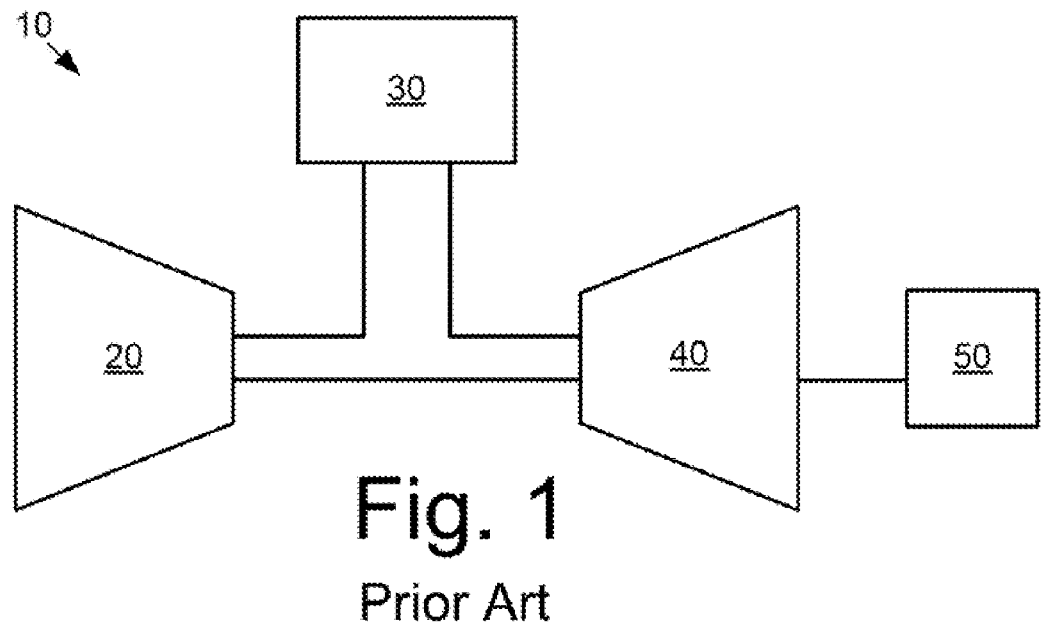
FIG. 1 is a schematic view of a gas turbine engine.

Referring now to the drawings, in which like numbers refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. (Although only a single combustor 30 is shown, the gas turbine engine 10 may include any number of combustors 30.) The hot combustion gases are in turn delivered to a turbine 40. The hot combustion gases drive the turbine 40 so as to produce mechanical work. The mechanical work produced by the turbine 40 drives the compressor and an external load 50 such as an electrical generator and the like.

The gas turbine engine 10 may use natural gas, various types of syngas, and other types of fuels. The gas turbine engine 10 may be a heavy duty gas turbine model offered by General Electric Company of Schenectady, N.Y. The gas turbine engine 10 may have other configurations and may use other types of components. Other types of gas turbine engines may be used herein. Multiple gas turbine engines, other types of turbines such as multi-shaft, reheat, etc., and other types of power generation may be used herein together. The present application also may be applicable to steam turbines, aircraft, and other types of rotating equipment.

Figure 2:
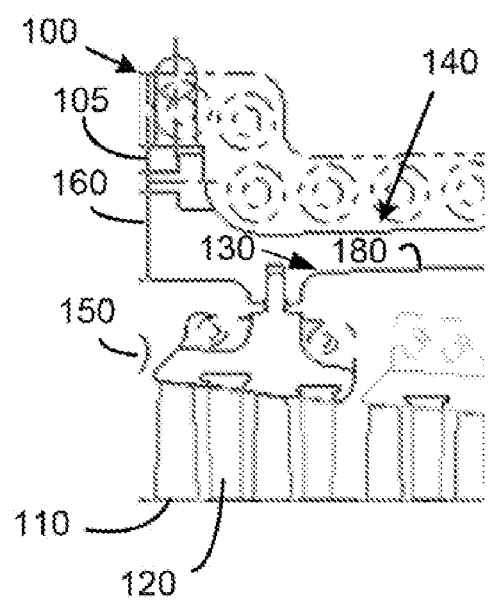
FIG. 2 is a side cross-sectional view of a gas turbine compressor that may be used herein.

FIG. 2 is a side cross-sectional view of a gas turbine engine compressor 100 as may be described herein. The gas turbine engine compressor 100 may be similar to the compressor 20 as described above. The compressor 100 may be any type of pressure containing turbomachinery casing 105. As is known, the compressor 100 may include a number of rotors 110 and a number of stators 120 so as to compress an incoming flow of air. The compressor 100 also may include a number of extraction cavities 130. As is known, air from the compressor 100 may be extracted via the extraction cavities 130 and forwarded to the turbine 40 for cooling the stages thereof and for other purposes. The compressor 100 may have a double wall configuration 140 with a floating member 150 and a static member 160. The floating member 150 may move in both the radial and axial directions so as to accommodate thermal growth and variations therein.

Specifically, the compressor 100 may include a high pressure extraction cavity 170 downstream of a low pressure extraction cavity 180. Any number of extraction cavities 130 may be used herein. The extraction cavities 170, 180 may meet at an interface 190. The floating member 150 may have an inverted "U" shape about the interface 190 while the static member 160 may have a somewhat larger inverted "U" shape. Other shapes may be used herein. The floating member 150 and the static member 160 may define a gap 195 therebetween.

Figure 3:
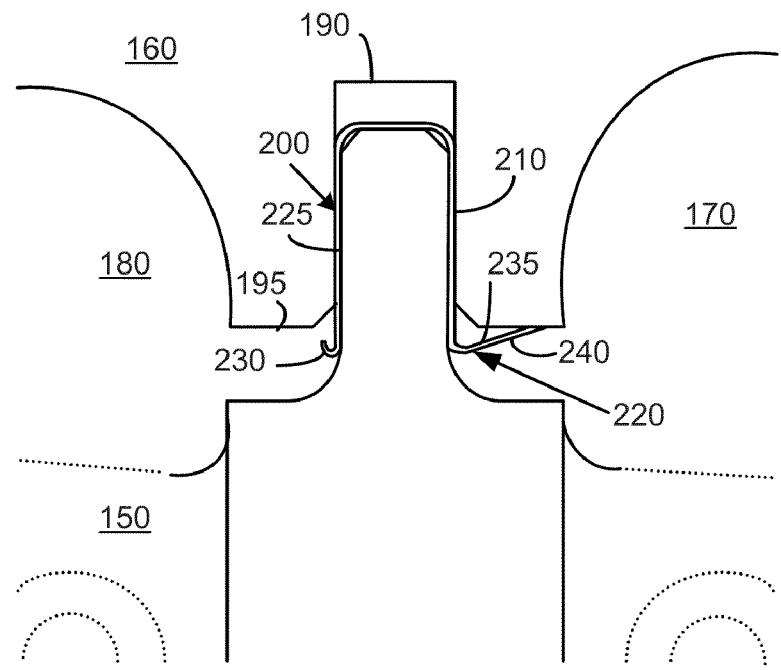
FIG. 3 is a side cross-sectional view of an extraction cavity interface with a wing seal as is described herein.

FIG. 3 shows a wing seal 200 as may be described herein. The wing seal 200 may have a largely "U" shape 210 to conform to the shapes of the floating member 150 and the static member 160 and to fill the gap 195 at the interface 190. The wing seal 200 may extend circumferentially about the floating member 150 and the static member 160. Specifically, the wing seal 200 may be a continuous ring or have multiple circumferential segments. The wing seal 200 may include a pair of wings 220. The wings 220 may take any shape. In this example, a first wing 225 may include a curl 230 while a second wing 235 generally may have a straight or flat angled shape 240. The wing seal 200 may be made out of corrosion resistant steel alloys and other types of metals or alloys with good heat resistance.

Figure 4:
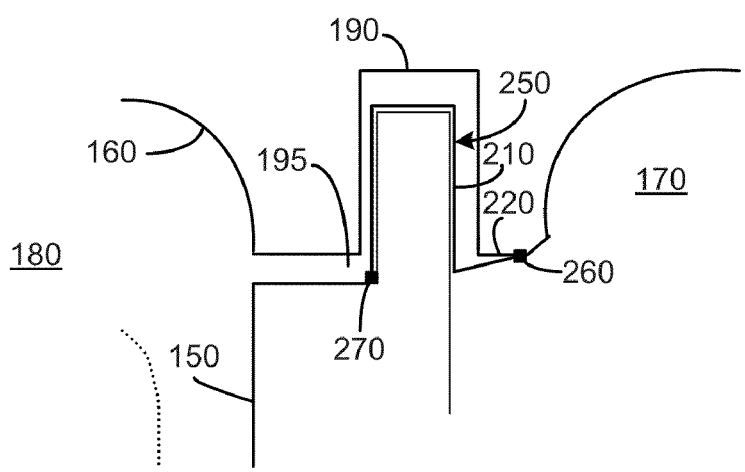
FIG. 4 is a side cross-sectional view of an extraction cavity interface with an alternative wing seal as is described herein.

FIG. 4 shows a further embodiment of a wing seal 250. As in the embodiment described above, the wing seal 250 may have the substantial U-shape 210. Here, the wing seal 250 only has one wing 220. In this example, the wing seal 220 includes a first connection 260 attached to the static member 160. The connection 260 may be a bolt or other types of connection means. The wing 220 abuts the static member 160 so as to minimize the flow area available for leakage between the cavities 170, 180. The wing seal 250 also may include a second connection 270 attached to the floating member 150.

Figure 5:
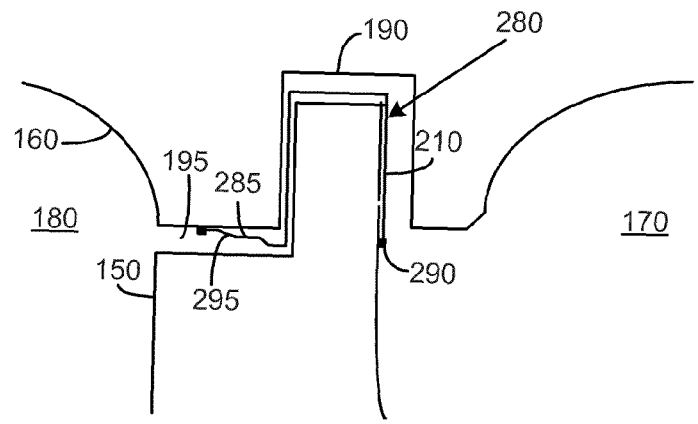
FIG. 5 is a side cross-sectional view of an extraction cavity interface with an alternative wing seal as is described herein.

FIG. 5 shows a further embodiment of a wing seal 280. In this example, a first wing 285 may be attached to the static member 160 while an end 290 of the U-shape 210 may be attached to the floating member 150. The first wing 285 may have a generally non-straight shape 295 as is shown.

Figure 6:
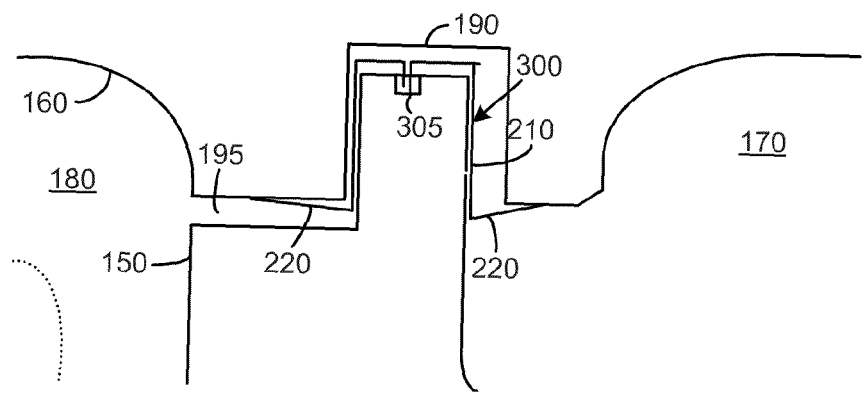
FIG. 6 is a side cross-sectional view of an extraction cavity interface with an alternative wing seal as is described herein.

FIG. 6 shows a further embodiment of a wing seal 300. The wing seal 300 may include the U-shape 210 and the wings 220. The wing seal 300 also may include an anchor 305 positioned about the floating member 150 so as to attach the wing seal 300 thereto. Other types of connection means may be used herein.

Figure 7:
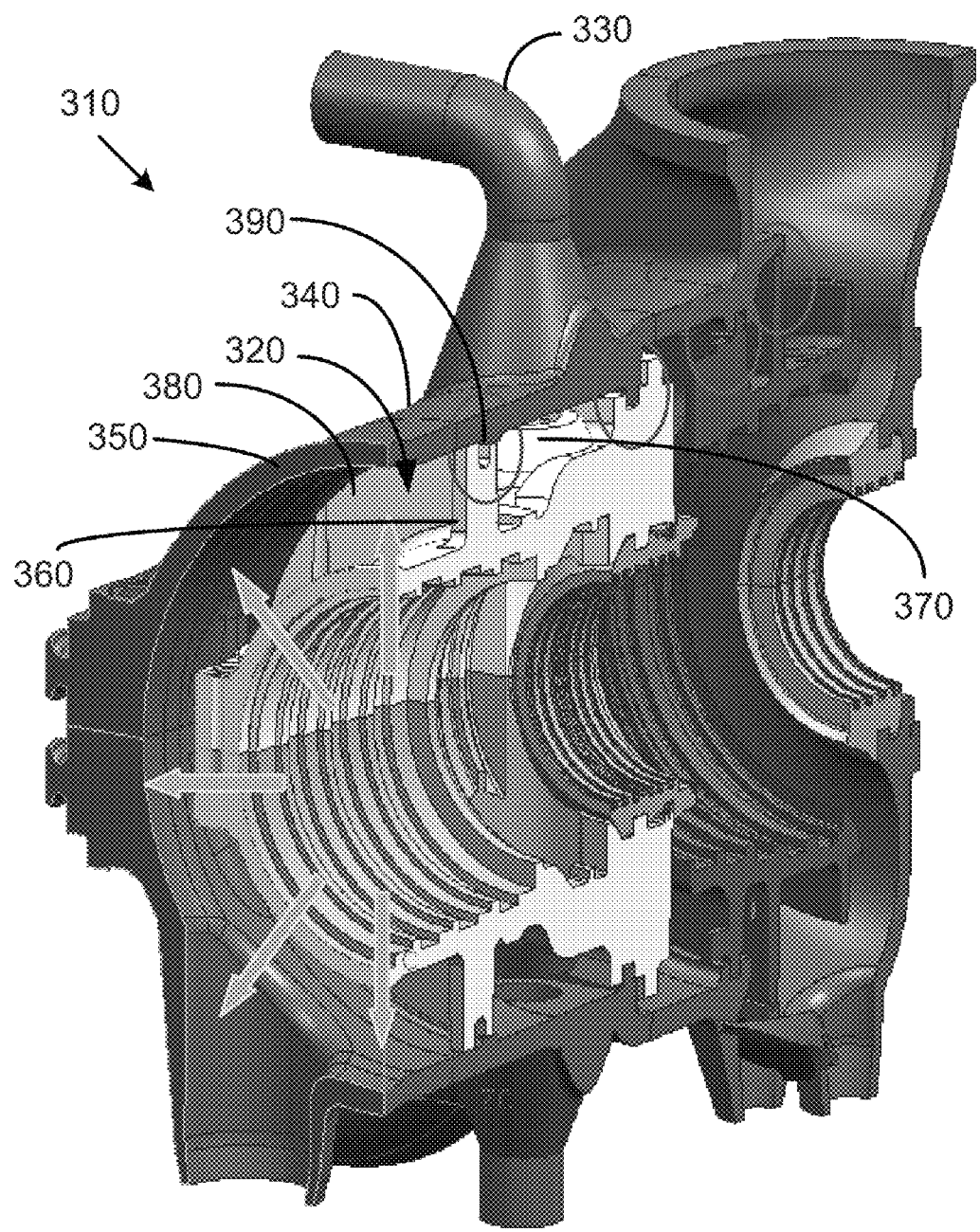
FIG. 7 is a side cross-sectional view of a steam turbine compressor that may be used herein.

FIG. 7 shows a stream turbine compressor 310 as may be described herein. The steam turbine compressor 310 also includes a number of extraction cavities 320. As above, the extraction cavities 320 are in communication with the turbine 40 via an extraction pipe 330. The steam turbine compressor 310 also may include a double wall design 340 with a floating member 350 and a static member 360. The steam turbine compressor 320 may include a high pressure extraction cavity 370 and a low pressure extraction cavity 380 with an interface 390 therebetween. The wing seals 200, 250, 280, 300, and similar designs also may be used with the steam turbine compressor 310 as is described above.

The wing seals 200, 250, 280, 300 described herein and similar designs thus accommodate radial movement and may slide axially over the static member 160 so as to provide sealing within the interface 190. Many other wing-type designs may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A pressure containing casing, comprising:
a floating member;
a static member;
a first extraction cavity formed between the floating member and the static member;
a second extraction cavity formed between the floating member and the static member;
an interface between the first extraction cavity and the second extraction cavity; and
a wing seal positioned within the interface;
wherein the floating member and the static member are positioned in a wall of the pressure containing casing; and
wherein a portion of the floating member is configured to float within a portion of the static member.

2. The casing of claim 1, wherein the interface comprises a gap between the floating member and the static member, and wherein the portion of the floating member is configured to float radially and axially relative to the portion of the static member.

3. The casing of claim 1, wherein the first extraction cavity comprises a high pressure extraction cavity and wherein the second extraction cavity comprises a low pressure extraction cavity.

4. The casing of claim 1, wherein the wing seal comprises a substantially "U" shaped portion.

5. The casing of claim 4, wherein the wing seal comprises one or more wings extending from the "U" shaped portion.

6. The casing of claim 5, wherein the one or more wings comprise a curled portion.

7. The casing of claim 5, wherein the one or more wings comprise a straight portion.

8. The casing of claim 5, wherein the one or more wings comprise a non-straight portion.

9. The casing of claim 5, wherein one of the one or more wings comprises a connection to the floating member.

10. The casing of claim 5, wherein the one or more wings comprise a connection to the static member.

11. The casing of claim 1, wherein the wing seal comprises a continuous ring or a plurality of circumferential segments.

12. A gas turbine engine, comprising:
a turbine;
a compressor in communication with the turbine;
the compressor comprising a floating member, a static member, a pair of extraction cavities, and an interface between the pair of extraction cavities; and
a wing seal positioned within the interface;
wherein the floating member and the static member are positioned in a wall of the compressor; and
wherein a portion of the floating member is configured to float within a portion of the static member.

13. The gas turbine engine of claim 12, wherein the interface comprises a gap between the floating member and the static member, and wherein the portion of the floating member is configured to float radially and axially relative to the portion of the static member.

14. The gas turbine engine of claim 12, wherein the wing seal comprises a substantially "U" shaped portion.

15. The gas turbine of claim 14, wherein the wing seal comprises a wing or a pair of wings extending from the "U" shaped portion.

16. The gas turbine engine of claim 15, wherein the wing or one of the pair of wings comprises a connection to the floating member or the static member.

17. A steam turbine engine, comprising:
a floating member;
a static member;
a plurality of pressurized cavities formed between the floating member and the static member;
an interface between the plurality of pressurized cavities; and
a wing seal positioned within the interface;
wherein the floating member and the static member are positioned in a wall of the steam turbine engine; and
wherein a portion of the floating member is configured to float within a portion of the static member.

* * * * *